(12) United States Patent
Mittal et al.

(10) Patent No.: US 8,983,447 B2
(45) Date of Patent: Mar. 17, 2015

(54) METHODS, SYSTEMS AND DEVICES FOR DYNAMIC HPLMN CONFIGURATION

(75) Inventors: Vineet Mittal, San Diego, CA (US); Kalle Ilmari Ahmavaara, San Diego, CA (US); Prabhu Govindaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 13/585,305

(22) Filed: Aug. 14, 2012

(65) Prior Publication Data

US 2014/0051422 A1 Feb. 20, 2014

(51) Int. Cl.
| | |
|---|---|
| H04M 3/00 | (2006.01) |
| H04W 4/00 | (2009.01) |
| H04W 8/02 | (2009.01) |
| H04W 8/18 | (2009.01) |
| H04W 12/04 | (2009.01) |

(52) U.S. Cl.
CPC ............... *H04W 4/003* (2013.01); *H04W 8/02* (2013.01); *H04W 8/18* (2013.01); *H04W 12/04* (2013.01)
USPC ........... 455/419; 455/418; 455/410; 455/411; 455/458

(58) Field of Classification Search
USPC ................................. 455/419, 558
See application file for complete search history.

(56) References Cited

U.S. PATENT DOCUMENTS

| | | | |
|---|---|---|---|
| 6,603,968 B2 | 8/2003 | Anvekar et al. | |
| 7,027,813 B2 * | 4/2006 | Hicks et al. | 455/432.1 |
| 2003/0045241 A1 * | 3/2003 | Noerpel et al. | 455/67.1 |
| 2005/0101323 A1 | 5/2005 | De Beer | |
| 2007/0042775 A1 * | 2/2007 | Umatt et al. | 455/434 |
| 2008/0090614 A1 * | 4/2008 | Sicher et al. | 455/558 |
| 2009/0124291 A1 | 5/2009 | Cha | |
| 2009/0170507 A1 * | 7/2009 | Kim | 455/433 |
| 2010/0136967 A1 | 6/2010 | Du et al. | |
| 2011/0270747 A1 * | 11/2011 | Xu | 705/40 |
| 2012/0064889 A1 * | 3/2012 | Tiwari | 455/434 |
| 2012/0077495 A1 | 3/2012 | Kim et al. | |
| 2012/0184267 A1 * | 7/2012 | Dwyer et al. | 455/426.1 |

FOREIGN PATENT DOCUMENTS

| | | |
|---|---|---|
| WO | WO-2006094564 A1 | 9/2006 |
| WO | WO-2011080637 A1 | 7/2011 |
| WO | 2011161490 A1 | 12/2011 |

OTHER PUBLICATIONS

International Search Report and Written Opinion—PCT/US2013/052376—ISA/EPO—Jan. 28, 2014.

* cited by examiner

*Primary Examiner* — Khalid Shaheed

(57) ABSTRACT

Methods, devices and systems enable the dynamic updating of home public land mobile network (HPLMN) information stored on a subscriber identification module (SIM) to avoid a roaming indication, without requiring any modifications to the mobile device modem, SIM application programming interface (API), the modem software, or the mobile device operating system. A mobile device may scan available public land mobile networks (PLMNs) to identify a participating PLMN to which the mobile device may connect, and receive network values having a mobile country code (MCC) value and a mobile network code (MNC) value from the identified PLMN. The mobile device may overwrite an existing HPLMN value and/or one or more IMSI values on the SIM with the receive network values.

17 Claims, 8 Drawing Sheets

METHODS, SYSTEMS AND DEVICES FOR DYNAMIC HPLMN CONFIGURATION

BACKGROUND

Cellular and mobile communication technologies have seen explosive growth over the past several years. Cellular service providers now offer a wide array of features and services, and wireless dongles and embedded wireless modem cards allow users to use their mobile electronic devices (e.g., tablets, laptops, etc.) to access wireless Internet protocol (IP) and data services through cellular networks. As a result, mobile device users now expect to be able to have access to IP and data services on their mobile devices anywhere in the world. However, despite many recent advancements cellular and mobile communication technologies, mobile device modems are still generally tied to a specific cellular service provider (e.g., AT&T®, Verizon®, Vodophone, etc.) and/or network, and communications over a different service provider's network (commonly known as "roaming") is often much more expensive than communicating over the mobile device's home network. These factors often limit a mobile device user's access to content, data, and communications when the mobile device is outside the geographical range of its home service provider network. With the ubiquity of mobile deices and an increasingly mobile public, improved access to IP and data services is expected to become an even more important consideration for mobile device consumers.

SUMMARY

The various embodiments include methods of dynamically updating a home public land mobile network (HPLMN) value on a subscriber identification module (SIM) of a mobile device, which may include identifying a participating public land mobile network (PLMN) to which the mobile device may connect, receiving network values from the identified network that include a mobile country code value and a mobile network code value, and overwriting an existing HPLMN value on the SIM with a new HPLMN value that includes the received mobile country code and mobile network code values. In an embodiment, overwriting an existing HPLMN value on the SIM with a new HPLMN value may include performing a directed memory write operation on the SIM by a modem of the mobile device via a standard SIM application programming interface (API). In a further embodiment, the mobile device may include a connectivity service client and the SIM may include a SIM applet, and the method may further include invoking a function of the SIM applet via the connectivity service client. In a further embodiment, the SIM may store a local international mobile subscriber identity (IMSI) value and a global IMSI value, and the method may further include generating a dynamic association between the global IMSI value and the local IMSI value on a network server and updating the local IMSI value on the SIM without altering the dynamic association between the global IMSI value and the local IMSI value maintained by the network server.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
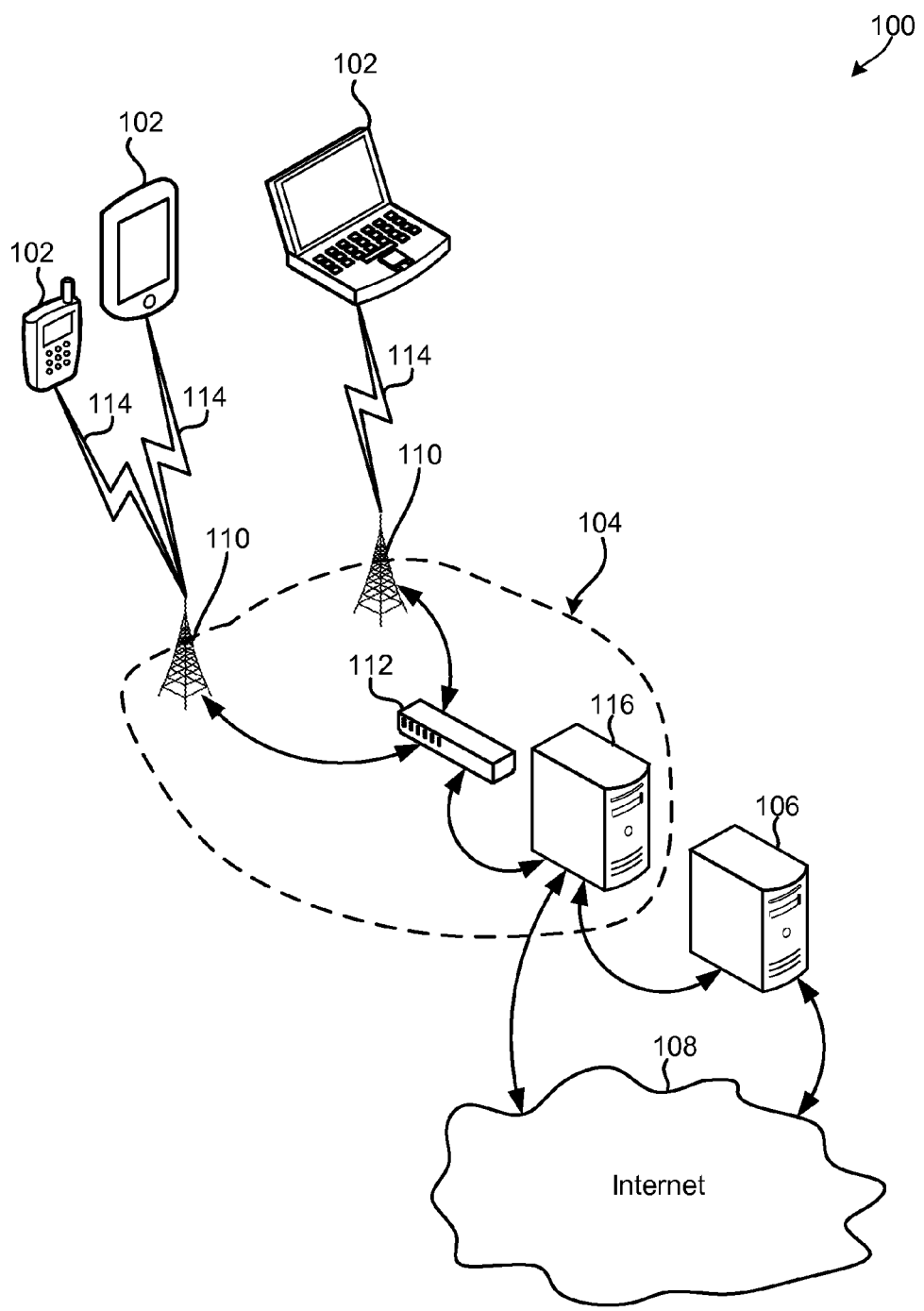
FIG. 1 is a communication system block diagram illustrating network components of an example telecommunication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device," and "computing device" are used interchangeably herein to refer to any one or all of cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals.

While the various embodiments are particularly useful in data-only mobile devices, such as tablets and laptops that have limited battery life, the embodiments are generally useful in any computing device that may be used to access wireless IP and data services through cellular communication networks.

The phrases "network Mobile Country Code/Mobile Network Code values," "network MCC/MNC values," and "network MCC/MNC value pair" may be used interchangeably herein to refer to any information that may be sent (broadcast, transmitted, etc.) from a network component or server in a cellular service provider network to a mobile device that identifies the cellular service provider or cellular service provider network to the mobile device.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

As mentioned above, wireless dongles and embedded wireless modem cards now enable mobile devices users to access wireless Internet protocol (IP) and data services through cellular networks. However, such dongles/modems often tie the mobile device a specific telecommunication service provider (e.g., AT&T, Verizon, etc.) by requiring that the mobile device connect to the global telecommunications network (and ultimately the Internet) through that service provider's cellular network (herein "home network"). When a connection through the home network is not available, such as when the mobile device is outside the geographical range of its home network, the mobile device may be allowed to "roam" by connecting through a different service provider's cellular network (herein "visited network"). While such roaming capability may provide a mobile device user with added mobility and connectivity, it is often much more expensive than accessing wireless IP and data services over the mobile device's home network. This added expense often limits the mobile device user's willingness to access IP and data services through cellular networks when the mobile device is outside the geographical range of the home network (i.e., when the device is roaming).

Due to the added expenses typically associated with roaming on conventional mobile devices, some mobile device applications and operating systems (e.g., Windows 7, 8, etc) include routines for ensuring that the mobile device user does not unexpectedly incur additional charges by unwittingly receiving data at roaming data rates. For example, some mobile device operating systems may prevent automatic connections to a visiting network and/or require that the user expressly authorize the connection to the visited network. For instance, a mobile device operating system may be configured such that when the mobile device is moved into a location in which the home network is not available, the mobile device operating system prompts the user and waits for the user's response before attempting to establish the connection to a visitor network (as opposed to automatically establishing a connection to the visitor network in the background). If the user agrees to establish a connection to the visited network, the operating system must then spend an additional amount of time (e.g., 4-5 seconds) establishing a connection to the visited network. Since the connection was not established in the background, the user must often actively wait while the connection is established before accessing IP and data services. This is often annoying and degrades the user experience.

In addition to preventing automatic connections to reduce user costs, some mobile device operating systems may be configured to automatically and periodically scan the available networks when the mobile device is in a roaming state to determine whether the home network is available. While such operations may be useful for consumers desiring to reduce costs by switching to the home network whenever possible, such scanning operations may include power intensive tasks that quickly deplete the mobile device battery and further degrade the user experience.

Additionally, some mobile device applications and/or operating systems may limit the amount of data sent and received over a visited network and/or repeatedly notify the user that the mobile device is roaming state in order to ensure that the mobile device user is aware of the potential costs associated with receiving data at roaming rates. While such routines and/or notifications may be beneficial for some users, they are often restrictive and/or annoying to users not concerned with paying the additional charges typically associated roaming.

As discussed above, mobile device users generally enjoy the convenience and mobility provided by cellular and mobile communication technologies that enable them to access wireless IP and data services through cellular networks, but may be restricted by the high costs associated with receiving data and services at roaming data rates. A recent addition to mobile communication technologies are modems, memories, and/or software systems that enable mobile device users to access cellular networks and/or the Internet anywhere in the world, at local non-roaming data rates. Examples of such technologies include Gobi® modems and Gobi® Connect manufactured by Qualcomm Inc.

Mobile devices that use Gobi® modems, Gobi® Connect, and/or other similar technologies (herein collectively "Gobi devices") are not tied to a specific cellular service provider, and thus, are not associated with a particular home network in the same manner as conventional mobile devices. Gobi devices receive cellular data services at local non-roaming rates due to preexisting agreements between the mobile device, modem, or chip manufacturer and participating cellular networks through which the Gobi devices connect. Since Gobi devices do not have a home network in the conventional sense, Gobi devices may be viewed alternatively as either always being in a roaming state (i.e., due to not having a home network) or as never being in a roaming state (i.e., due to always receiving local, non-roaming, data rates).

While Gobi® and related technologies provide mobile device users with the convenience of being able to access cellular networks and/or Internet anywhere in the world at consistent or non-roaming rates, these technologies are not yet fully supported by many existing mobile device software systems. As discussed above, some mobile device applications and operating systems (e.g., Windows 7, 8, etc.) include routines and/or notifications for ensuring that the mobile device user does not incur additional charges by unwittingly receiving data at the typically more expensive roaming data rates. As also discussed above, these routines/notifications may be restrictive and/or annoying to users not concerned with the additional charges typically associated with roaming data rates, such as users of Gobi devices. Additionally, since Gobi devices always receive data at local non-roaming data rates, such notifications may confuse or mislead Gobi device users into believing that they are receiving IP data services at roaming rates, when if fact they are receiving the IP data services at local non-roaming rates. These factors often combine to degrade the user experience for users of Gobi devices.

The various embodiments overcome the above-mentioned limitations of existing solutions by enabling mobile devices to seamlessly change communication networks without triggering the restrictive, misleading, and/or annoying roaming alert routines discusses above.

Generally, each mobile device includes a subscriber identification module (SIM) hardware, memory, or card that stores one or more encoded values that identify the mobile device's home network. The SIM may also store values that identify the current network to which the mobile device is connected. If the encoded values identifying the mobile device's home network do not match the values identifying the current network, the mobile device, the mobile device operating system, the mobile device modem, and/or software applications on the mobile device may determine that the mobile device is in a roaming state and invoke the above-mentioned restrictive, misleading, and/or annoying roaming routines.

As an example, when a mobile device modem is powered on, the modem may scan the available cellular networks to determine whether a connection through the home network is available, which may be achieved by comparing encoded values stored on the SIM to one or more values received from the cellular networks to determine whether the encoded values identify at least one of the available cellular networks as being the mobile device's home network. If the encoded values identify at least one of the available cellular networks as the home network, the mobile device may automatically establish a connection to the home network and update the values identifying the current network stored on the SIM to match those of the home network.

On the other hand, when the encoded values stored on the SIM do not match any of the values received from the available cellular networks, the mobile device modem may traverse a preferred roaming list to identify a visitor network through which the mobile device may connect to the global telecommunication network. In some cases the mobile device may display a prompt requesting that the user authorize the connection through the visitor network. If the user authorizes the connection, the mobile device may establish a connection to the visitor network and update the values identifying the current network to match that of the visitor network. In such scenarios, the encoded values that identify the mobile device's home network will not match those identifying the current network, and the mobile device will identify itself as being in roaming state, thereby triggering the restrictive, misleading, and/or annoying roaming routines included in existing mobile device software solutions.

The various embodiments dynamically update the encoded values stored on the SIM to match those of a currently available network so that the mobile device always identifies itself or otherwise appears to an operating system as being in its home network. In this manner, the various embodiments may avoid triggering the restrictive, misleading, and/or annoying roaming alert routines included in existing mobile device software solutions discussed above.

In an embodiment, the mobile device may be configured to dynamically update all or parts of one or more International Mobile Subscriber Identity (IMSI) values stored on a SIM. In an embodiment, the mobile device may be configured to dynamically update a home public land mobile network (HPLMN) value stored on the SIM. In an embodiment, the mobile device may be configured to dynamically update the HPLMN value and one or more IMSI values stored on the SIM.

In an embodiment, the mobile device may include client software configured to update the encoded values (e.g., HPLMN, IMSI, etc.) stored on the SIM without requiring any modifications to existing commercial modems, modem software, modem interfaces, or SIM application programming interfaces (APIs) of the mobile device. In an embodiment, the mobile device may be configured with a SIM that includes a SIM applet configured to read and write (and overwrite) encoded values on the mobile device SIM.

The various embodiments may be implemented within a variety of communication systems, such as the example communication system 100 illustrated in FIG. 1. The communication system 100 may include one or more mobile devices 102, a telephone network 104, and network servers 106 coupled to the telephone network 104 and to the Internet 108. In an embodiment, the network server 106 may be implemented as a server within the network infrastructure of the telephone network 104.

A typical telephone network 104 includes a plurality of cell base stations 110 coupled to a network operations center 112, which operates to connect voice and data calls between mobile devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the mobile devices 102 and the telephone network 104 may be accomplished via two-way wireless communication links 114, such as GSM, UMTS, EDGE, 4G, 3G, CDMA, TDMA, LTE, and/or other communication technologies.

Figure 2:
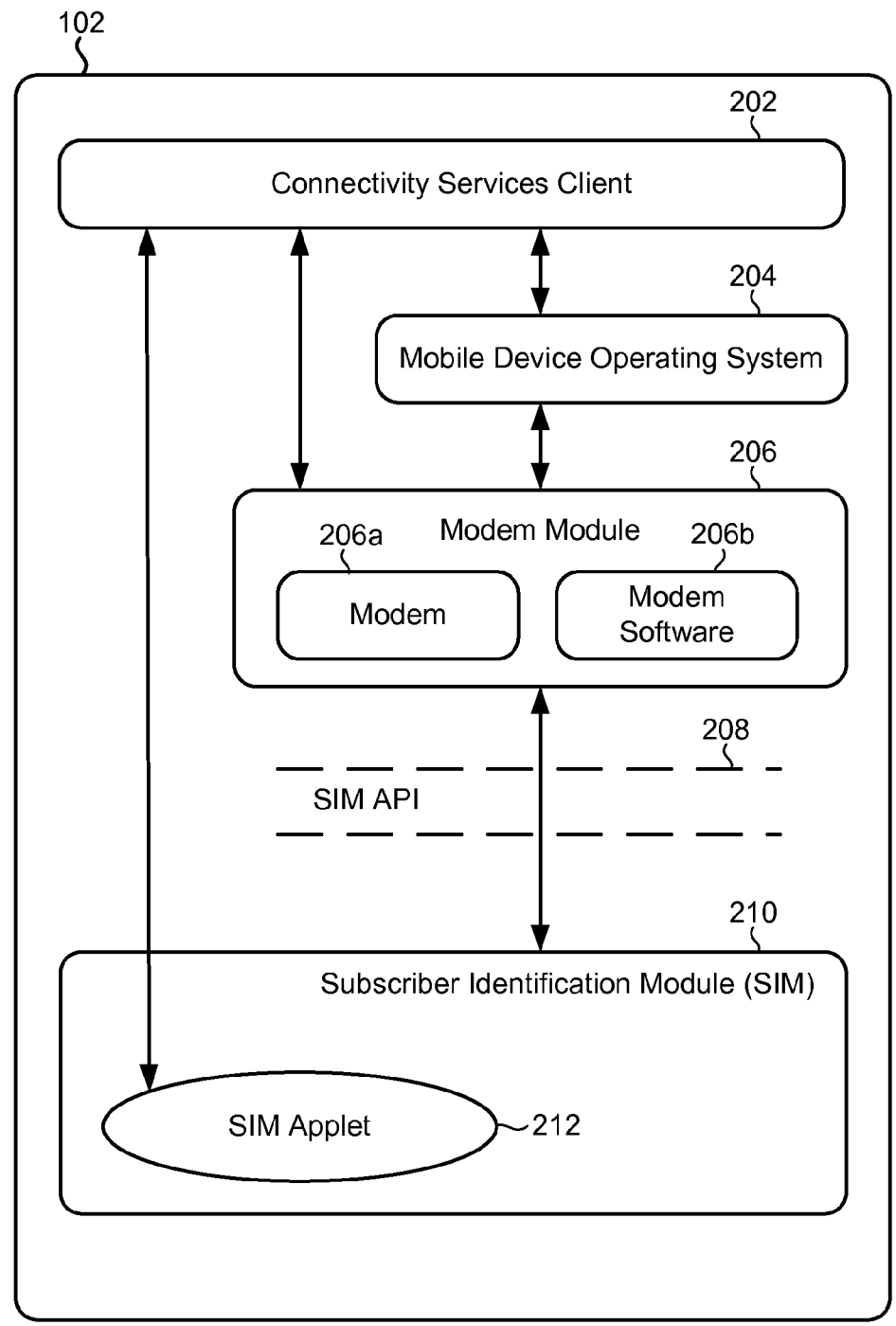
FIG. 2 is a computer architectural diagram illustrating example components and communication links in a mobile device configured to receive cellular services anywhere in the world at local non-roaming rates and avoid roaming indications.

FIG. 2 illustrates example functional components, software modules, and application programming interfaces (APIs) of an embodiment mobile device 102 configured to receive cellular data services at local non-roaming rates without triggering the restrictive, misleading, and/or annoying software roaming routines of existing mobile device software solutions. Specifically, FIG. 2 illustrates that the mobile device 102 may include a connectivity services client 202, a mobile device operating system 204, a modem module 206, a SIM API 208, and a SIM 210. The connectivity services client 202 may include Gobi® Connect client software, which is manufactured by Qualcomm Inc. The SIM 210 may include a SIM applet 212 configured to read and write (and overwrite) encoded values stored on the SIM 210.

The modem module 206 may include a mobile device modem 206a and/or modem software 206b. In various embodiments, the mobile device software 206b may be implemented on the mobile device modem 206a chip, in firmware, or as part of the mobile device operating system 204.

The SIM 210 may be implemented in hardware, a mobile device memory, and/or a removable memory card. In an embodiment, the SIM 210 may be a virtual SIM, a removable user identity module (R-UIM), a Mini SIM, a MicroSIM, an embedded SIM, or any other similar identity module. In an embodiment, the SIM may be a 3GPP compliant SIM card configured to support UMTS, EDGE, GPRS, LTE, CDMA, and/or other related communication technologies. In an embodiment, the SIM 210 may be configured to support a Milenage authentication algorithm, which is a known algorithm that is based on an Advanced Encryption Standard (AES).

The SIM 210 may store information required by one or more radio systems to identify, authenticate, and/or locate the mobile device 102. The SIM 210 may also store one or more authentication keys (Ki), a global International Mobile Subscriber Identity (IMSI) value, a local IMSI value, a current IMSI value, and/or a home public land mobile network (HPLMN) value. The IMSI, HPLMN, and Ki values may be stored on the SIM in a proprietary or encoded format such that mobile device users and/or third parties cannot readily access or modify the stored values. In an embodiment, one or more of the IMSI values stored on the SIM may be associated with one or more of the Ki values stored on the SIM.

In an embodiment, each of the local and global IMSI values may be stored on the SIM 210 as a sixty-four (64) bit field or a fifteen (15) digit number. The first three digits of each of the IMSI values may store a Mobile Country Code (MCC) value, and the next three digits may store a Mobile Network Code (MNC) value. The combination of the MCC and MNC values may uniquely identify a specific cellular service provider (e.g., AT&T, Verizon, etc.) network. The remaining nine (9) digits of each of the IMSI values may store a Mobile Subscription Identification Number (MSIN), which may be an identification number that uniquely identifies the mobile device 102 and/or the mobile device user.

The HPLMN value may be stored on the SIM 210 as a six digit number. The HPLMN value may include MCC/MNC values, the combination of which may uniquely identify a cellular service provider network. The MCC/MNC values included in the HPLMN value may be independent of the MCC/MNC values included as part of the local and global IMSI values. For example, the MCC/MNC values of the HPLMN value may identify a different cellular service provider than each of the cellular service providers identified by either of the MCC/MNC value pairs included in the global and local IMSI values.

In an embodiment, the authentication key (Ki) may be stored on the SIM 210 as a 128-bit value. The Ki may be assigned to the SIM 210 by a specific cellular service provider (e.g., AT&T) or device manufacturer, and may correspond to an authentication value stored on an authentication center (AUC) component in a cellular network. The Ki may be associated with one or more of the IMSI values stored on the SIM 210.

The modem module 206 may be configured to receive encoded information from a cellular network, and forward the encoded information to the SIM 210 for decoding. The SIM 210 may be configured to decode encoded values received from the modem module 206, and send the decoded values to the connectivity services client 202 (e.g., via the modem module 206, etc.) for analysis and/or processing.

The modem module 206 may communicate with the SIM 208 through the SIM API 208. The mobile device operating system 204 may communicate with the SIM 210 through the modem module 206. For example, the mobile device operating system 204 may request HPLMN information from the modem module 206, which may request to read the HPLMN value stored on the SIM 208 through the SIM API 208. In this manner, the mobile device operating system 204 may inquire about the roaming status of the mobile device 102 through the modem module 206.

In various embodiments, the SIM applet 212 may implement one or more functions that may be invoked by the connectivity services client 202 (e.g., through a client-SIM API, etc.), the modem module 206, and/or the SIM 210. For example, the SIM applet 212 may implement a write (or overwrite) function that may be invoked by the connectivity services client 202 (either directly or indirectly) to dynamically update the local IMSI value, the global IMSI value, and/or HPLMN value, any or all of which may be stored in a proprietary or encoded format on the SIM 210 such that they may only be modified by the SIM applet functions.

In an embodiment, the SIM applet 212 may implement one or more functions that may be invoked directly by the connectivity services client 202. For example, the modem module 206 may be configured to receive encoded network information from a cellular network, and forward encoded network information to the SIM 210. The SIM 210 may be configured to decode encoded network values and send the decoded values to the connectivity services client 202. The connectivity services client 202 may be configured to invoke one or more functions (e.g., a write HPLMN function) implemented by the SIM applet 212 based on the decoded values, and send the decoded values to the modem module 206. The modem module 206 may compare the decoded values received from connectivity services client 202 with the HPLMN value stored on the SIM 210 to determine whether the mobile device is in its home network.

In an embodiment, the SIM applet 212 may implement one or more functions that may be invoked indirectly by the connectivity services client 202. For example, connectivity services client 202 may be configured to send a payload that includes invocation information to the modem module 206. The modem module 206 may be configured to receive the payload from the connectivity services client 202, generate a request message that includes the payload, and send the generated request message to the SIM 210 via the SIM API 208. The SIM 210 may be configured to receive and decode the request message sent from the modem module 206, extract the invocation information, and invoke one or more functions implemented by SIM applet 212 based on the invocation information. In this manner, no modifications to existing mobile device modems and/or modem software package are required for the modem module 206 to invoke the SIM applet functions, and the mobile device 102 may be equipped with any of a number of commercially available modems and/or modem software products.

In an embodiment, the connectivity services client 202 may be configured to identify information that may cause the modem module 206 to request information from the SIM 210. The connectivity services client 202 may be further configured to invoke one or more functions implemented by the SIM applet 212 based on the identified information. For example, the connectivity services client 202 may be configured so that when the mobile device receives network information identifying an available network, the connectivity services client 202 invokes a write function of the SIM applet 212 to overwrite the existing HPLMN value with the network identifier of the identified available network prior to the modem module 206 being informed of the availability of the identified network.

In an embodiment, the SIM applet 212 may implement one or more functions that may be invoked in response to the modem module 206 communicating with the SIM 212. For example, the SIM applet 212 may implement a write function (e.g., write HPLMN function) that may be invoked each time the modem module 206 requests to write information (e.g., HPLMN information) to the SIM 210.

Figure 3:
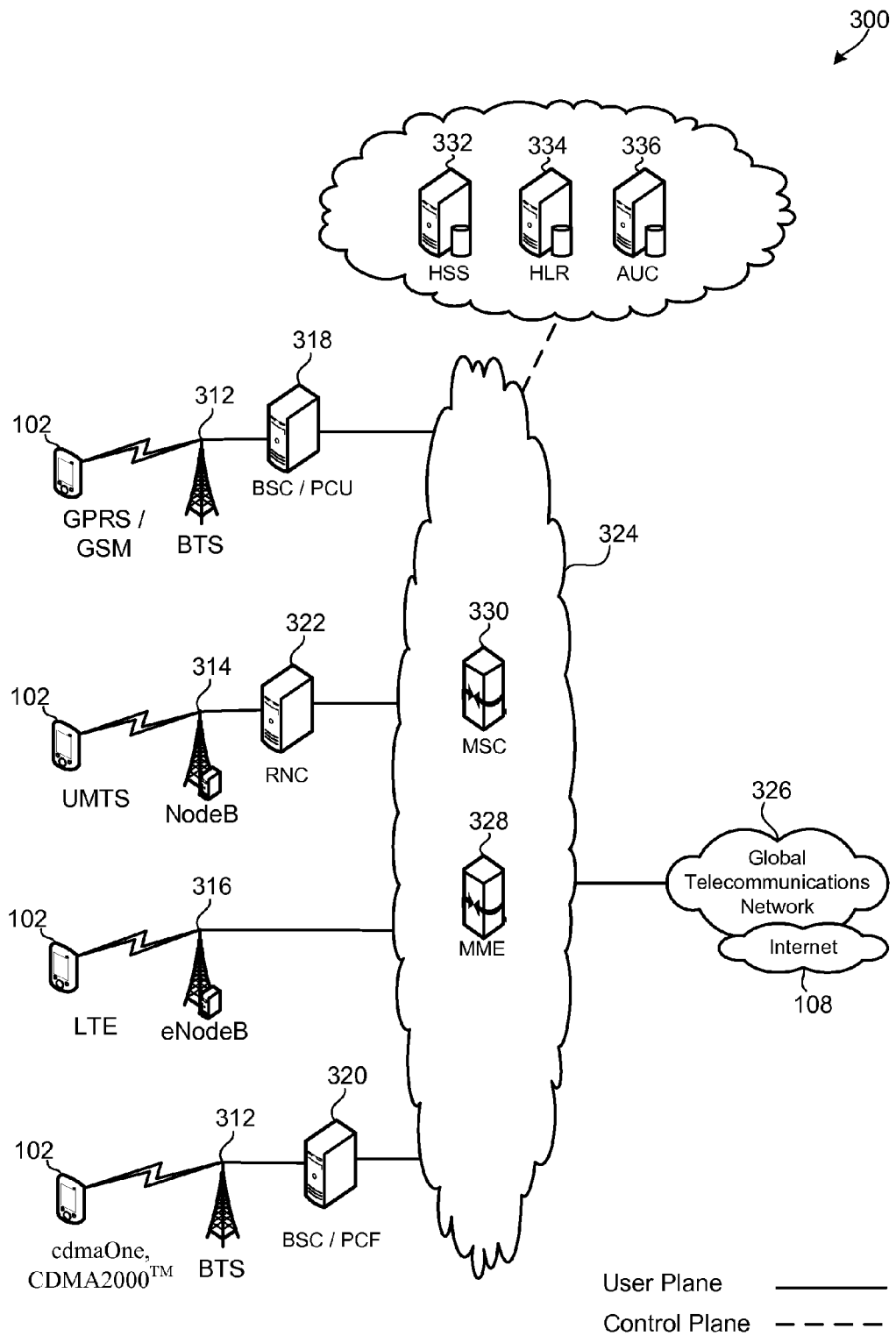
FIG. 3 is a communication system block diagram illustrating network components, communication links, and information flows of an example communication system suitable for use in the various embodiments.

FIG. 3 illustrates logical components, communication links, and information flows in an example communication system 300 suitable for use with the various embodiments. The mobile device 102 may be configured to send and receive IP data and control signals to and from the global telecommunications network 326 (and ultimately the Internet 108) using a variety of communication systems/technologies (e.g., GPRS, UMTS, LTE, cdmaOne, CDMA2000™). For example, FIG. 3 illustrates that the mobile device 102 may send general packet radio service (GPRS) data to a base transceiver station (BTS) 312, which may send the GPRS data to a base station controller (BSC) and/or packet control unit (PCU) component (BSC/PCU) 318. Likewise, code division multiple access (CDMA) data transmitted from the mobile device 302 may be received by a base transceiver station 312 and sent to a base station controller (BSC) and/or point coordination function (PCF) component (BSC/PCF) 320. Universal mobile telecommunications system (UMTS) data transmitted from the mobile device 102 may be received by a NodeB 314 and sent to a radio network controller (RNC) 322. Long term evolution (LTE) data transmitted from a wireless device 102 may be received by an eNodeB 316 and sent to a network component (e.g., serving gateway or "SGW," etc.) located within a core network 324.

The BSC/PCU 318, BSC/PCF 320, and RNC 322 components may process the GPRS/GSM, UMTS and CDMS data, respectively, and send the processed data to a network component within the core network 324. The core network 224 may include various known network components (e.g., serving GPRS support node or "SGSN," packet data serving node or "PDSN," etc.) that perform various administrative tasks (e.g., user authentication, enforcement of roaming restrictions, etc.) and/or serve as connection points between the various radio access networks and the IP data networks. Since these structures are well known, certain details have been omitted in order to focus the descriptions on the most relevant features.

In an embodiment, the core network 324 may include a mobility management entity (MME) 328 component, a mobile service switching centre (MSC) 330 component, a home subscriber server (HSS) 332 component, a home location register (HLR) 334 component, and/or an authentication center (AUC) 336 component. The MME 328 and/or MSC 330 components may be configured to request user/subscription information from the HSS 332 and/or HLR 334 components based on the information received from the mobile device 102, such as IMSI values received from the mobile device 102. The HSS 332, HLR 334, and/or AUC 336 components may store information for identifying, authorizing, and/or authenticating the mobile device 102, the SIM 210, IMSI values, the mobile device user, and/or the service provider network. Information stored in the network (e.g., in the HLR 334 or HSS 332) that may be transmitted to the mobile device 102 to uniquely identify a service provider network is herein referred to generically as "network MCC/MNC values."

The AUC 336 component may include a protected database that stores a 128-bit secret shared authentication key (Ki), which may correspond to the authentication key (Ki) stored on the SIM 210 and may be associated with an IMSI stored on the SIM 210. The Ki may not be communicated between the AUC 336 and the SIM 210, but combined with the corresponding IMSI to generate challenge/response messages for identification and verification of the SIM 210 and/or cellular network.

In an embodiment, the mobile device 102 may be a Gobi device (i.e., a mobile device that includes a Gobi® modem, Gobi® connect software, or otherwise includes functionality similar to that provided by Gobi® technologies). In an embodiment, the HLR 334 component may be a Gobi® Connect HLR component. In an embodiment, the HLR 334 component (or a network component equivalent to the HLR 334 component) may send network MCC/MNC values to the mobile device 102.

When a modem of the mobile device 102 is powered on or is moved into a geographical area covered by a different cellular network, the modem may scan the available networks to identify available networks through which the mobile device may connect to the global telecommunications network 326 and ultimately to the Internet 108. This may be achieved by the mobile device 102 receiving network MCC/MNC values sent from the available networks, and determining whether any of the received MCC/MNC values match information stored on a mobile device SIM (e.g., SIM 210 illustrated in FIG. 2).

A conventional mobile device may first determine whether the network MCC/MNC values match the MCC/MNC values of the global IMSI value stored on the mobile device SIM. If the values match, the mobile device modem and/or mobile device operating system may determine that the mobile device is in its home network and automatically establish a connection to the identified network in the background. On the other hand, if the network MCC/MNC values do not match the MCC/MNC values of the global IMSI value stored on the SIM, a conventional mobile device may traverse a preferred roaming list to identify a visitor network through which the mobile device may connect to the global telecommunication network 326. A conventional mobile device may then display a prompt requesting that the user authorize a connection to the visitor network. After receiving such authorization, a conventional mobile device may overwrite the local IMSI value to be equal to that of an IMSI value received from the visitor network. In such scenarios, the MCC/MNC values of the local IMSI value will differ from the MCC/MNC values of the global IMSI value, which may cause some mobile device applications and operating systems to determine that the mobile device is in a roaming state and/or cause the mobile device modem to automatically and periodically scan the available networks to determine whether the home network is available.

As mentioned above, in an embodiment, the mobile device 102 may be a Gobi device, which may not be associated with a home network in the same manner as conventional mobile devices. In such embodiments, the mobile device 102 may be configured to first determine whether the network MCC/MNC values received from the available networks identify the most recent public land mobile network (PLMN) through which the mobile device 102 established a connection to the global telecommunications network 326 and/or the Internet 108. In various embodiments, this may be achieved by a modem or processor of the mobile device 102 comparing the received network MCC/MNC values to any or all of the HPLMN value, the MCC/MNC values of the local IMSI value, and/or the MCC/MNC values of the global IMSI value, any or all of which may be stored on the SIM 210 and accessible via the connectivity services client 202 and/or the SIM API 208.

In an embodiment, when the mobile device 102 determines that the received network MCC/MNC values do not match the HPLMN value stored on the mobile device SIM 210, the modem module 206 (e.g., the modem 206a) may scan the available networks to identify a participating network (i.e., a network having preexisting agreement with the mobile device, chip, or software manufacturer) through which the mobile device 102 may connect to the global telecommunication network 326. When a participating network is identified, the mobile device 102 may receive a new network MCC/MNC values from the identified network, and update any or all of the HPLMN, local IMSI, and global IMSI values stored on the SIM 210 to include the network MCC/MNC values received from the identified participating network. In this manner, the HPLMN value stored on the mobile device SIM 210 may match the MCC/MNC values of the local IMSI value and/or the MCC/MNC values of the global IMSI. This may cause the modem module 206 and/or mobile device operating system 204 to determine that the mobile device 102 is its home network (i.e., not in a roaming state) and/or is receiving IP data and services at local, non-roaming rates. In this manner, the various embodiments may avoid triggering the restrictive, misleading, and/or annoying roaming routines included in existing mobile device software solutions.

Figure 4:
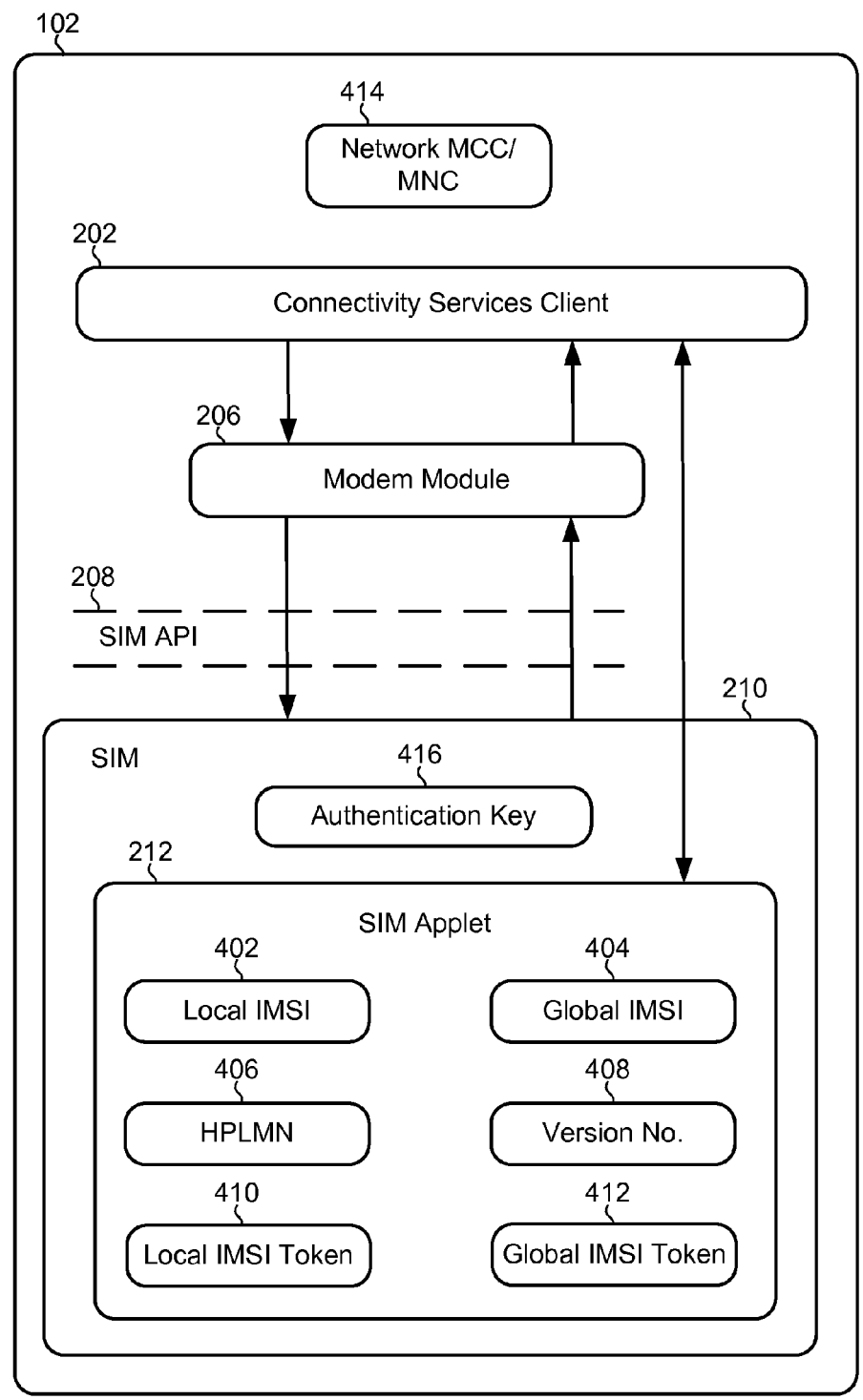
FIG. 4 is a computer architectural diagram illustrating example functional components and information flows in mobile device configured to read and write encoded values to and from a subscriber identification module in accordance with various embodiments.

FIG. 4 illustrates example functional components and information flows in mobile device 102 configured to read and write encoded values to and from the SIM 210 in accordance with various embodiments. Specifically, FIG. 4 illustrates that the mobile device 102 may include a connectivity services client 202, a modem module 206, a client-SIM API 208, a SIM 210, and a SIM applet 212. The SIM applet 212 may store (or include references or links to) a local IMSI value 402, a global IMSI value 404, an HPLMN value 406, a version number 408, a local IMSI token 410, and a global IMSI token 412. In an embodiment, the SIM 210 may be provisioned with an authentication key 416. In an embodiment, the SIM 210 may further store an integrated circuit card identifier (ICCID), a local area identity (LAI), an operator-specific emergency number, short message service center (SMSC) information, value added service (VAS) application information, a service provider name (SPN), a service dialing number (SDN), an advice-of-charge parameter, and other similar information.

The SIM applet 212 may be preconfigured with a default global IMSI value 404 and a default HPLMN value 406 by any of the SIM, modem, chip, or mobile device manufacturers. The local IMSI value 402 may store a zero, null, or empty value by default. The global IMSI value 404 and the local IMSI value 402 may be maintained by the SIM 210 across power cycles. Each of the local IMSI 402, the global IMSI 404, and HPLMN 406 values may be both readable and writeable (and overwrite-able).

The authentication key 416 may be a 128-bit value Ki value for authenticating the SIM 210 and/or the cellular network. The global IMSI value 404 may be paired to the authentication key 414 in the SIM 210, and this pairing may be replicated on a HSS component 332 (illustrated in FIG. 3) of the cellular network. These pairings may authenticate any or all of the mobile device subscriber, the cellular network and/or the integrity of IMSI values to the mobile device 102 and/or one or more network components (e.g., AUC 336 illustrated in FIG. 3, etc.).

The mobile device 102 and the HSS component 332 may each store and/or maintain a dynamic association between global IMSI value 404 and the local IMSI value 402, which may be used by the mobile device and/or network components to authenticate a mobile device subscriber and/or the cellular network.

The version number 408 may include an applet version number for the SIM applet 212 that may accommodate multiple releases and/or updates to the SIM applet 212.

Each of the local IMSI token 410 and the global IMSI token 412 may include an integrated circuit card identifier (ICCID), a local or global IMSI value, and a signature value. The ICCID and the signature value may be used by the SIM applet 212 to authorize, authenticate, and/or verify the legitimacy of the containing token 410, 412, and to ensure that the SIM 210 is the intended recipient of the token 410, 412.

In an embodiment, the SIM applet 212 may be configured to receive a token value, decrypt the received token value, verify of a signature of the token, and update only the MCC/MNC values of the local 402 and/or global 404 IMSI values.

FIG. 4 illustrates that the mobile device 102 may receive (e.g., in a modem 206a) encoded network MCC/MNC values 414 (e.g., from an HLR 334 component through the core network 324) from a participating network (i.e., a network having preexisting agreement with the mobile device, chip, or software manufacturer). The received encoded network MCC/MNC values 414 may be encoded such that they may only be decoded by a component or module having access to an authentication key 416 or an appropriate token (e.g., local IMSI token 410, global IMSI token 412). The mobile device 102 may send the encoded network MCC/MNC values 414 to the SIM 210 for decoding, authentication, and/or verification. The SIM 210 may send the decoded network MCC/MNC values 414 to the connectivity services client 202 for analysis or processing.

In various embodiments, the connectivity services client 202 may invoke, either directly or indirectly, one or more functions in SIM applet 210 to cause the SIM applet 210 set the HPLMN value 406 and/or the MCC/MNC values of the local IMSI value 402 to be equal to the values contained in the received network MCC/MNC values 414.

In an embodiment, the connectivity services client 202 may indirectly invoking a functionality of the SIM applet 212 through the modem module 206. For example, the connectivity services client 202 may generate an augmented message that includes instructions for invoking one or more SIM applet functions and/or the network MCC/MNC values 414. The connectivity services client 202 may send the augmented message to the modem module 206, which may receive and forward the augmented message to the SIM 210 via the SIM API 208. The SIM 210 may receive and decode the augmented message, and invoke one or more functions of the SIM applet 212 to set the HPLMN value 406 and/or the MCC/MNC values of the local IMSI value 402 to be equal to the network MCC/MNC values 414.

The connectivity services client 202 may inform the modem module 206 of the reception of a new network values. The modem module may compare the HPLMN value 406 and/or local IMSI value 402 stored on the SIM 210 with the received network MCC/MNC values 414 to determine whether the mobile device 102 is in its home network. Since the HPLMN value and/or MCC/MNC values of the local IMSI value 402 were previously updated to be equal to network MCC/MNC values 414, the modem mobile 206 may determine that the mobile device 102 is in its home network, and inform the mobile device operating system 204 accordingly.

Generally, provisioning of IMSI and HPLMN values on SIM cards is tightly controlled by the cellular service providers, which may encrypt the information on the SIM to prevent unauthorized access to their networks. One of the benefits provided by the various embodiments is that the SIM applet 212 and/or connectivity service client 202 enable the mobile device 102 to modify the encoded IMSI and/or HPLMN values stored on the SIM card.

Figure 5:
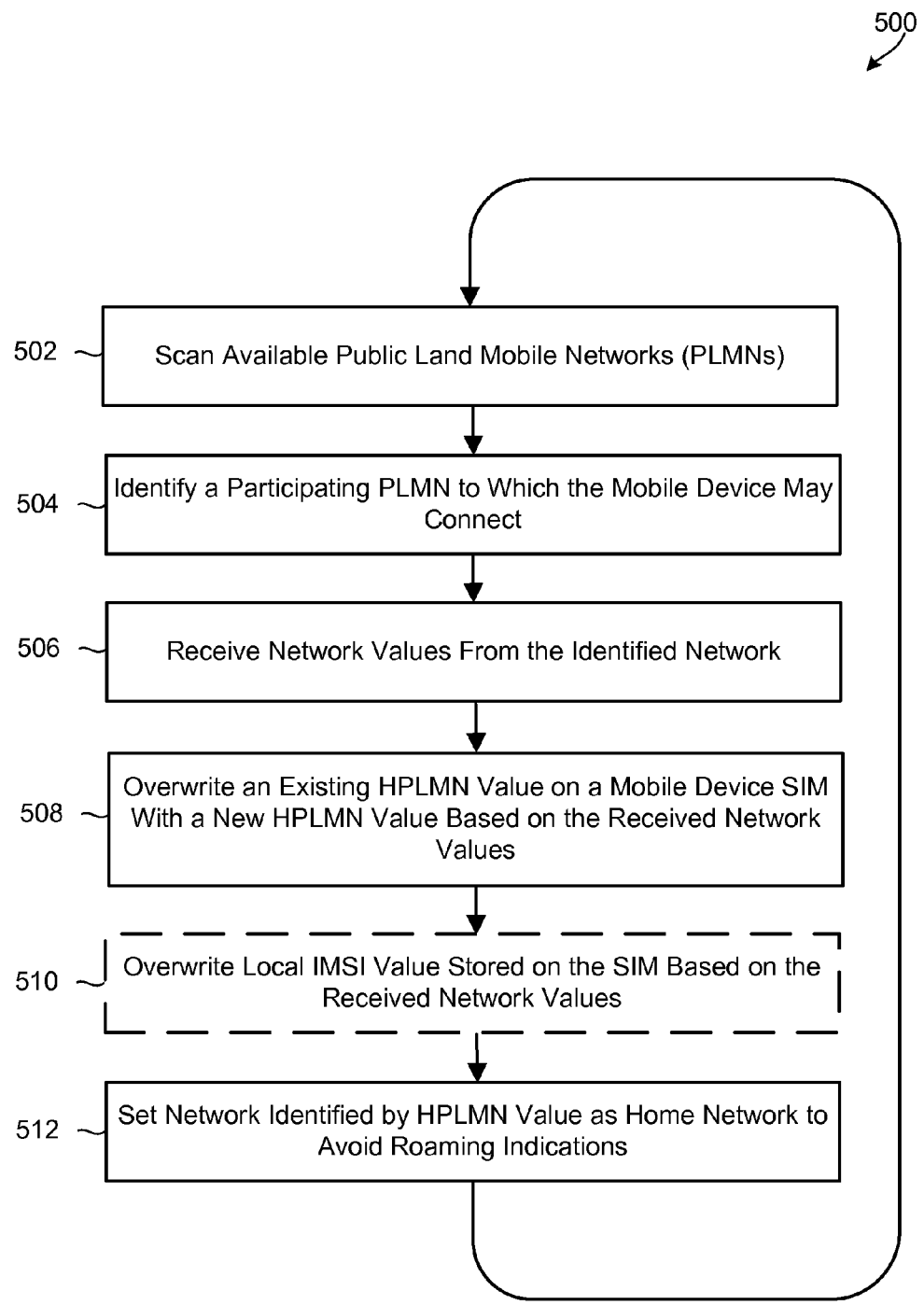
FIG. 5 is a process flow diagram illustrating an embodiment mobile device method for dynamically updating home public land mobile network value on a subscriber identification module in accordance with an embodiment.

FIG. 5 illustrates an embodiment mobile device method 500 of dynamically updating home public land mobile network (HPLMN) value on a subscriber identification module (SIM). In block 502, a mobile device modem may scan the available public land mobile networks (PLMNs). In block 504, the mobile device modem may identify a participating PLMN (i.e., a network having preexisting agreement with the mobile device, chip, or software manufacturer) to which the mobile device may connect. In block 506, the mobile device modem may receive network values from the identified network. In various embodiments, the received network values may be an IMSI value, an MCC/MNC value pair, or other identification information. In block 508, the mobile device modem or a mobile device processor may overwrite an existing HPLMN value on a mobile device SIM to include information included in the received network values, for instance, by overwriting the existing HPLMN value on the mobile device SIM with a new HPLMN value based on the received network values. In optional block 510, the mobile device modem or processor may overwrite all or a portion of an existing local IMSI value on a mobile device SIM to include information included in the received network values. In block 512, the mobile device may set a network identified by the HPLMN value as its home network to avoid roaming indications.

Figure 6:
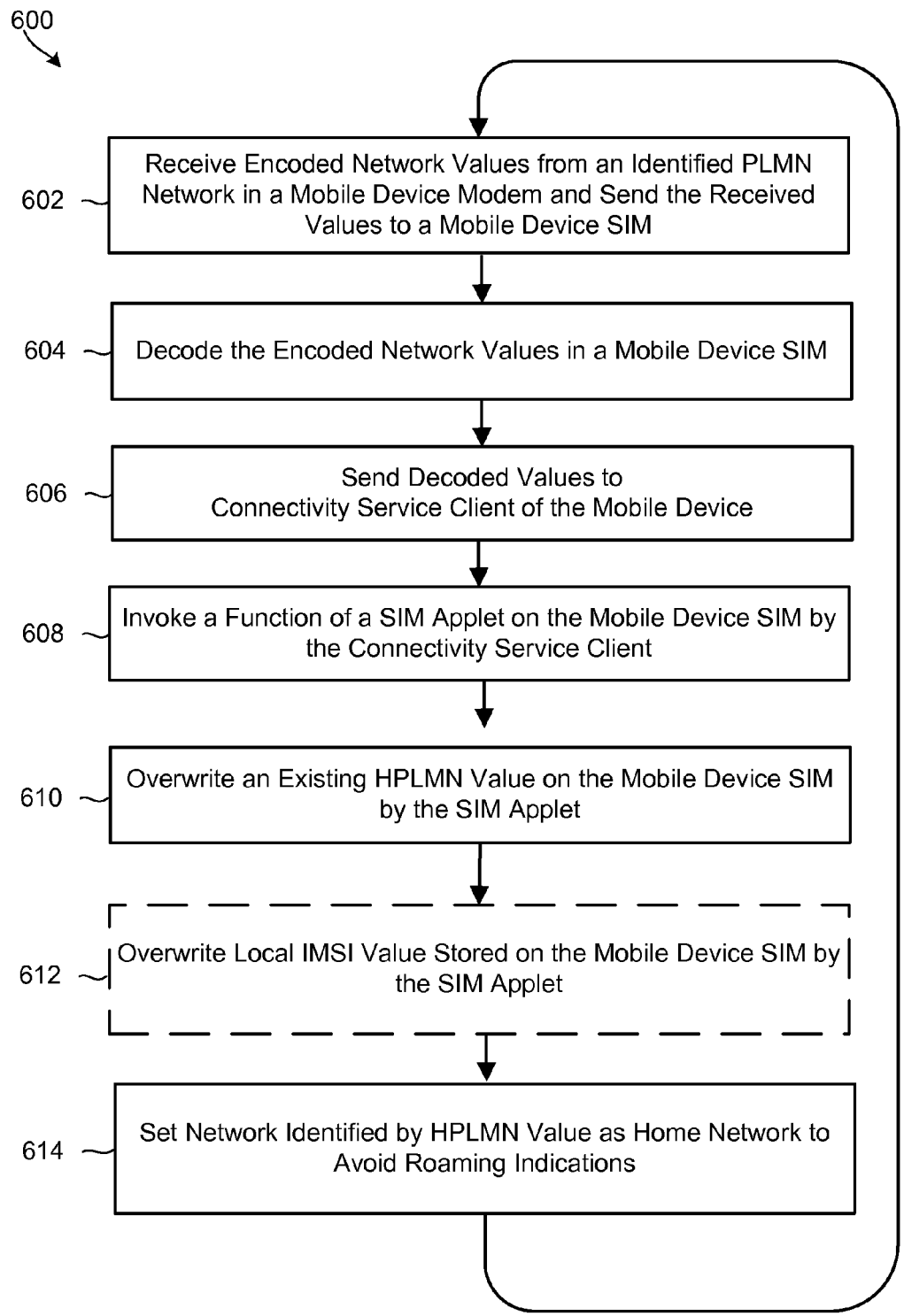
FIG. 6 is a process flow diagram illustrating an embodiment mobile device method for invoking an applet to update home public land mobile network value on a subscriber identification module in accordance with an embodiment.

FIG. 6 illustrates an embodiment mobile device method 600 of invoking an applet to dynamically update a home public land mobile network (HPLMN) value on a subscriber identification module (SIM). In block 602, the mobile device modem may receive encoded network values (e.g., IMSI, MCC/MNC values, etc.) from a participating network and send the received encoded values to a mobile device SIM for decoding, authentication, and/or verification. In block 604, the mobile device SIM may decode the encoded values. In block 606, the mobile device SIM may send the decoded values to a connectivity service client of the mobile device. In block 608, the connectivity service client may invoke one or more functionalities provided by a SIM applet of the mobile device SIM. In an embodiment, this may be achieved by the connectivity services client indirectly invoking a SIM applet function through the mobile device module. For example, the connectivity services client may generate an augmented message that includes instructions for invoking one or more functions of the SIM applet, and send the augmented message to mobile device modem for forwarding to the SIM applet. In block 610, the SIM applet may overwrite an existing HPLMN value on the mobile device SIM. In optional block 612, the SIM applet may overwrite all or a portion of a local IMSI value on the mobile device SIM. In block 614, the mobile device may set a network identified by the HPLMN value as its home network to avoid roaming indications.

A cellular network may include multiple disjointed networks, each of which may be identified by a different MCC/MNC value combination. In such scenarios, the MCC/MNC values of the global IMSI may not accurately identify the home network to which a mobile device belongs. By updating a HPLMN value in addition to the local IMSI value on the SIM, the various embodiments may ensure that the mobile device receives cellular data services at local non-roaming rates without triggering the restrictive, misleading, and/or annoying software roaming routines that may be included in existing mobile device software solutions.

Another benefit provided by the various embodiments is that the IMSI and/or HPLMN values may be updated on the SIM without any modifications to the mobile device modem, SIM API, modem software, or the mobile device operating system. This enables the various embodiments to include any of a number of commercially available modems, operating systems, and software packages.

Yet another benefit provided by the various embodiments is reduced power consumption. When roaming, a mobile device may automatically and periodically (e.g., based on an HPLMN timer, etc.) scan the available networks to determine whether a connection to the home network is available. Such scanning operations may be power intensive tasks that quickly deplete the mobile device battery. Since Gobi devices or similar devices may receive cellular data services at local non-roaming rates irrespective of the network through which they connect, these scanning operations are not necessary and may degrade the user experience. By avoiding roaming indications, the various embodiments prevent the mobile device from automatically and periodically scanning the available networks to determine whether a connection to the home network is available, thereby reducing the amount of power consumed by the mobile device.

In addition, the cellular service providers typically authenticate the mobile device via the Ki/global IMSI pairings and/or the local IMSI/global IMSI associations. By updating only the MCC/MNC values of the IMSIs, the various embodiments avoid altering the Ki/global IMSI pairings and/or the local IMSI/global IMSI associations used for authentication.

Figure 7:
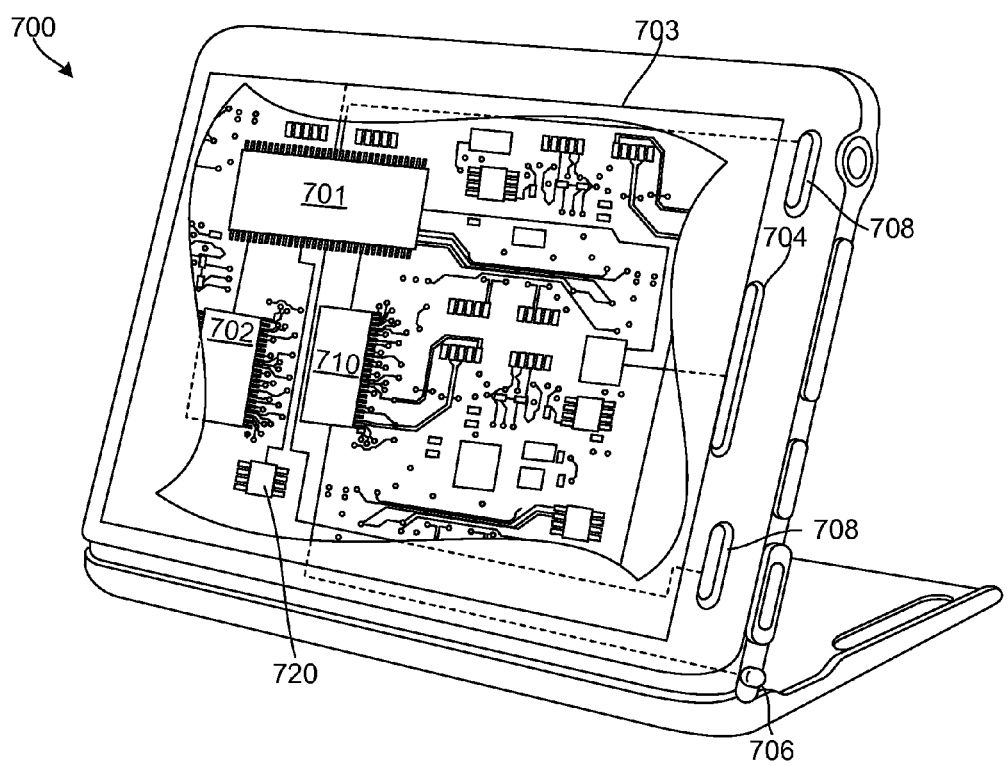
FIG. 7 is a component block diagram illustrating a mobile device suitable for implementing the various aspects.

The various embodiments may be implemented on a variety of mobile computing devices, an example of which is illustrated in FIG. 7. Specifically, FIG. 7 is a system block diagram of a mobile transceiver device in the form of a smartphone 700 suitable for use with any of the embodiments. An exemplary smartphone 700 may include a processor 701 coupled to internal memory 702, a display 703, and to a speaker 704. Additionally, the smartphone may have an antenna 706 for sending and receiving electromagnetic radiation that may be connected to a wireless data link and/or cellular telephone transceiver 710 coupled to the processor 701. Smartphone typically also include a key pad, menu selection buttons, or rocker switches 708 for receiving user inputs.

A smartphone 700 may also include a sound encoding/decoding (CODEC) circuit 720 which digitizes sound received from a microphone into data packets suitable for wireless transmission and decodes received sound data packets to generate analog signals that are provided to the speaker 704 to generate sound. Also, one or more of the processor 701, cellular telephone transceiver 710, and CODEC 720 may include a digital signal processor (DSP) circuit (not shown separately).

Figure 8:
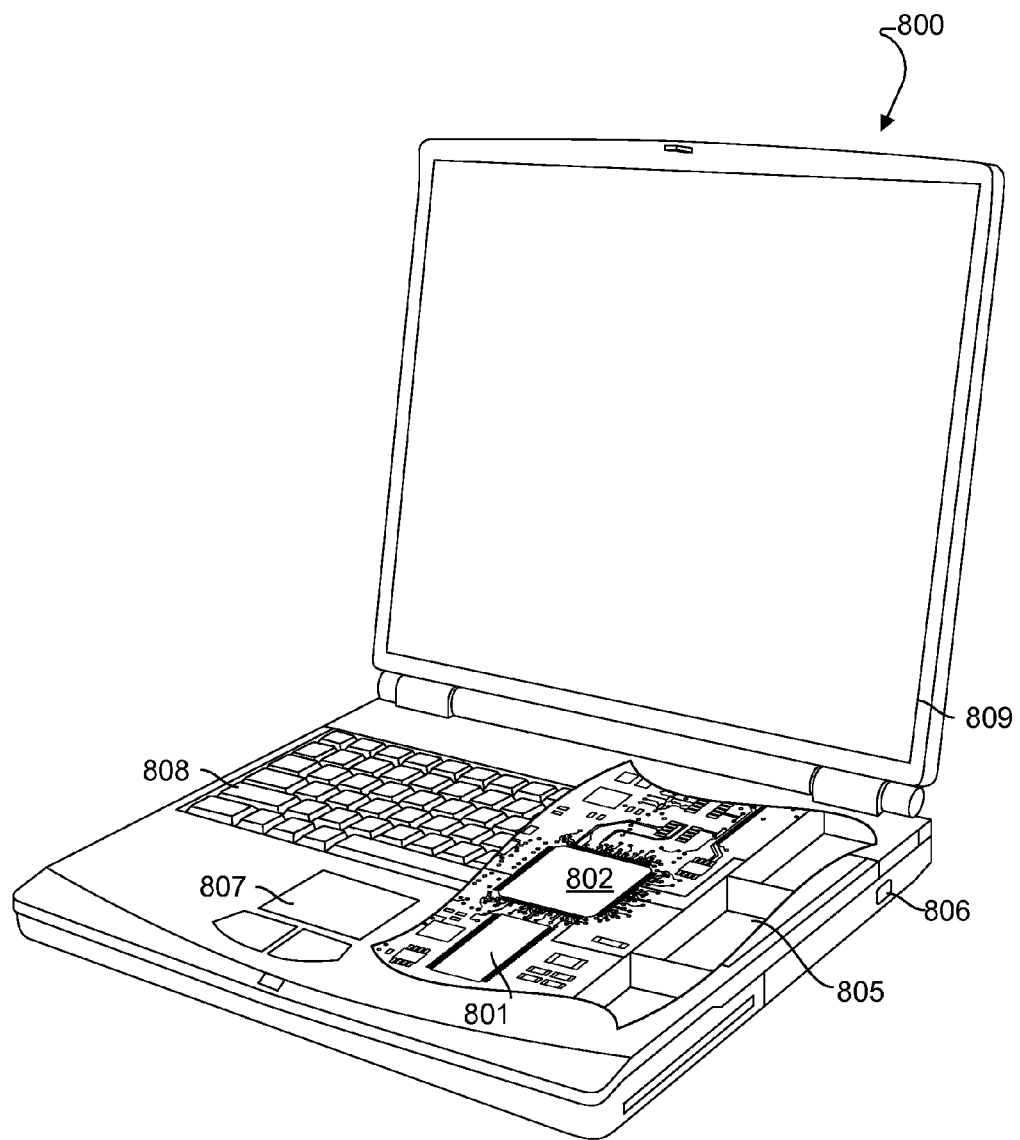
FIG. 8 is a component block diagram illustrating another mobile device suitable for implementing the various aspects.

FIG. 8 illustrates another exemplary mobile device 800 in the form of a laptop computer suitable for use with the various aspects. The mobile device 800 may include a processor 801 coupled to internal memory 802, and a display 809. Additionally, the mobile device may have a communication port 805 for sending and receiving information. The mobile device 800 may also include a keyboard 808 and selection buttons/pad 807 for receiving user inputs. The mobile device 800 may have an antenna for sending and receiving electromagnetic radiation that may be connected to a wireless data link and/or cellular telephone transceiver 806 coupled to the processor 801.

The processors 701, 801 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor dedicated to wireless communication functions and one processor dedicated to running other applications. Typically, software applications may be stored in the internal memory 702, 802, before they are accessed and loaded into the processor 701, 801. The processor 701, 801 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for dynamically updating a home public land mobile network (HPLMN) value on a subscriber identification module (SIM) of a mobile device, comprising:
   by the mobile device, identifying an available public land mobile network (PLMN) to which the mobile device may connect;
   by the mobile device, receiving network values from the identified PLMN network, the received network values including a mobile country code value and a mobile network code value;
   by the mobile device, determining whether the received network values match the existing HPLMN value on the SIM; and
   by the mobile device, overwriting an existing HPLMN value on the SIM with a new HPLMN value that includes the received mobile country code value and the received mobile network code value in response to determining that the received network values do not match the existing HPLMN value on the SIM, wherein overwriting an HPLMN value on the SIM with a new HPLMN value that includes the received mobile country code value and the received mobile network code value comprises:
      performing a memory write operation on the SIM via an application programming interface (API).

2. The method of claim 1, wherein overwriting an existing HPLMN value on the SIM with a new HPLMN value that includes the received mobile country code value and the received mobile network code value comprises:
   performing a the memory write operation on the SIM by a modem of the mobile device via the application programming interface (API).

3. The method of claim 1, wherein the mobile device includes a connectivity service client and the SIM includes a SIM applet, the method further comprising:

invoking a function of the SIM applet via the connectivity service client.

4. The method of claim 1, wherein the SIM stores a local international mobile subscriber identity (IMSI) value and a global IMSI value, the method further comprising:
generating a dynamic association between the global IMSI value and the local IMSI value on a server.

5. The method of claim 4, further comprising:
by the mobile device, updating the local IMSI value on the SIM without altering the dynamic association between the global IMSI value and the local IMSI value on the server.

6. A mobile device, comprising:
means for identifying an available public land mobile network (PLMN) to which the mobile device may connect;
means for receiving network values from the identified PLMN network, the received network values including a mobile country code value and a mobile network code value;
means for determining whether the received network values match the existing HPLMN value on the SIM; and
means overwriting an existing home public land mobile network (HPLMN) value on a subscriber identification module (SIM) of the mobile device with a new HPLMN value that includes the received mobile country code value and the received mobile network code value in response to determining that the received network values do not match the existing HPLMN value on the SIM, wherein overwriting an HPLMN value on the SIM with a new HPLMN value that includes the received mobile country code value and the received mobile network code value comprises:
means for performing a memory write operation on the SIM via an application programming interface (API).

7. The mobile device of claim 6, wherein means for overwriting an existing HPLMN value on the SIM with a new HPLMN value that includes the received mobile country code value and the received mobile network code value comprises:
means for performing a directed memory write operation on the SIM via a standard SIM application programming interface (API).

8. The mobile device of claim 6, further comprising:
means for invoking a function of a SIM applet of the SIM via a connectivity service client process.

9. A mobile device, comprising:
a transceiver;
a subscriber identification module (SIM); and
a processor coupled to the transceiver and the SIM, wherein the processor is configured with processor-executable instructions to perform operations comprising:
identifying an available public land mobile network (PLMN) to which the mobile device may connect;
receiving network values from the identified PLMN, the received network values including a mobile country code value and a mobile network code value;
determining whether the received network values match the existing HPLMN value on the SIM; and
overwriting an existing home public land mobile network (HPLMN) value on the SIM with a new HPLMN value that includes the received mobile country code value and the received mobile network code value in response to determining that the received network values do not match the existing HPLMN value on the SIM, wherein overwriting an HPLMN value on the SIM with a new HPLMN value that includes the received mobile country code value and the received mobile network code value comprises:
performing a memory write operation on the SIM via an application programming interface (API).

10. The mobile device of claim 9, wherein the processor is configured with processor-executable instructions to perform operations such that overwriting an existing HPLMN value on the SIM with a new HPLMN value that includes the received mobile country code value and the received mobile network code value comprises performing a directed memory write operation on the SIM via a standard SIM application programming interface (API).

11. A non-transitory computer readable storage medium having stored thereon processor-executable software instructions configured to cause a processor to perform operations for dynamically updating home public land mobile network (HPLMN) value on a subscriber identification module (SIM) of a mobile device, the operations comprising:
identifying an available public land mobile network (PLMN) to which the mobile device may connect;
receiving network values from the identified PLMN network, the received network values including a mobile country code value and a mobile network code value;
determining whether the received network values match the existing HPLMN value on the SIM; and
overwriting an existing HPLMN value on the SIM with a new HPLMN value that includes the received mobile country code value and the received mobile network code value in response to determining that the received network values do not match the existing HPLMN value on the SIM, wherein overwriting an HPLMN value on the SIM with a new HPLMN value that includes the received mobile country code value and the received mobile network code value comprises:
performing a memory write operation on the SIM via an application programming interface (API).

12. The non-transitory computer readable storage medium of claim 11, wherein the stored processor-executable software instructions are configured to cause a processor to perform operations such that overwriting an existing HPLMN value on the SIM with a new HPLMN value that includes the received mobile country code value and the received mobile network code value comprises:
performing a directed memory write operation on the SIM via a standard SIM application programming interface (API).

13. The method of claim 1, wherein the identifying of the available PLMN further comprises identifying the available PLMN as a participating network through which the mobile device may connect to a global telecommunication network.

14. The method of claim 1, wherein the identifying of the available PLMN further comprises determining that the received mobile country code value and the received mobile network code value do not match the existing HPLMN value stored on the SIM.

15. The method of claim 1, wherein the overwriting of the existing HPLMN value on the SIM with the new HPLMN value further comprises:
updating at least one of a local IMSI value and a global IMSI value stored on the SIM to include the received mobile country code value and the received mobile network code value.

16. The method of claim 1, further comprising determining that, in response to the overwriting of the existing HPLMN value on the SIM with the new HPLMN value, the mobile device is in a home network or a non-roaming state.

17. The method of claim 1, further comprising avoiding, in response to the overwriting of the existing HPLMN value on the SIM with the new HPLMN value, executing a roaming routine.

* * * * *